United States Patent
Coker

(10) Patent No.: US 9,176,944 B1
(45) Date of Patent: Nov. 3, 2015

(54) SELECTIVELY PROCESSING USER INPUT

(75) Inventor: Doug Coker, San Francisco, CA (US)

(73) Assignee: Google Inc., Mountain View, CA (US)

(*) Notice: Subject to any disclaimer, the term of this patent is extended or adjusted under 35 U.S.C. 154(b) by 456 days.

(21) Appl. No.: 13/215,851

(22) Filed: Aug. 23, 2011

(51) Int. Cl.
G06F 17/27 (2006.01)
G06F 17/24 (2006.01)
G06F 17/21 (2006.01)
G06F 17/30 (2006.01)

(52) U.S. Cl.
CPC ............ *G06F 17/243* (2013.01); *G06F 17/218* (2013.01); *G06F 17/276* (2013.01); *G06F 17/2775* (2013.01); *G06F 17/30867* (2013.01)

(58) Field of Classification Search
CPC .............. G06F 17/218; G06F 17/2775; G06F 17/30867; G06F 17/243
USPC ............................................................ 704/9
See application file for complete search history.

(56) References Cited

U.S. PATENT DOCUMENTS

| | | | | |
|---|---|---|---|---|
| 7,216,292 | B1* | 5/2007 | Snapper et al. | 715/236 |
| 7,606,741 | B2* | 10/2009 | King et al. | 705/27.2 |
| 8,032,823 | B2* | 10/2011 | Tomasic et al. | 715/226 |
| 8,170,868 | B2* | 5/2012 | Gamon et al. | 704/9 |
| 8,423,899 | B1* | 4/2013 | Crane et al. | 715/780 |
| 2002/0107896 | A1* | 8/2002 | Ronai | 707/530 |
| 2003/0014448 | A1* | 1/2003 | Castellanos et al. | 707/530 |
| 2004/0205525 | A1* | 10/2004 | Murren et al. | 715/505 |
| 2005/0044425 | A1* | 2/2005 | Hypponen | 713/202 |
| 2006/0265648 | A1 | 11/2006 | Rainisto et al. | |
| 2006/0265668 | A1 | 11/2006 | Rainisto | |
| 2006/0286514 | A1 | 12/2006 | Gross | |
| 2007/0016792 | A1 | 1/2007 | Allen, Jr. et al. | |
| 2007/0299881 | A1* | 12/2007 | Bouganim | 707/200 |
| 2008/0010316 | A1* | 1/2008 | Liao et al. | 707/104.1 |
| 2008/0065665 | A1* | 3/2008 | Pomroy et al. | 707/101 |
| 2008/0144817 | A1 | 6/2008 | Brown et al. | |
| 2008/0183649 | A1* | 7/2008 | Farahani et al. | 706/14 |
| 2009/0029328 | A1 | 1/2009 | Voegeli et al. | |
| 2009/0195506 | A1 | 8/2009 | Geidl et al. | |
| 2009/0281974 | A1* | 11/2009 | Saxena et al. | 706/14 |
| 2010/0083103 | A1* | 4/2010 | Paek et al. | 715/256 |
| 2010/0256977 | A1* | 10/2010 | Yu et al. | 704/240 |
| 2010/0285435 | A1* | 11/2010 | Keim et al. | 434/157 |
| 2010/0321299 | A1 | 12/2010 | Shelley et al. | |
| 2010/0332287 | A1* | 12/2010 | Gates et al. | 705/10 |
| 2011/0077936 | A1* | 3/2011 | Arumugam et al. | 704/9 |
| 2011/0082844 | A1 | 4/2011 | Bao et al. | |

(Continued)

OTHER PUBLICATIONS

Berger, Adam L., Stephen A. Della Pietra, and Vincent J. Della Pietra. "A Maximum Entropy Approach to Natural Language Processing." IBM T.J. Watson Research Center; Yorktown Heights, NY; 1996. (36 pages).

(Continued)

Primary Examiner — Jakieda Jackson
(74) Attorney, Agent, or Firm — Fish & Richardson P.C.

(57) ABSTRACT

In general, the subject matter described in this specification can be embodied in methods, systems, and program products. A computing system receives text that represents content input by a user. A computing system determines a randomness level for a portion of the text. A computing system determines whether the randomness level for the portion of text exceeds a threshold level. A computing system, responsive to determining that the randomness level does not exceed the threshold level, provides the portion of text for processing by a text processing system.

17 Claims, 8 Drawing Sheets

(56) References Cited

U.S. PATENT DOCUMENTS

2011/0099602 A1* 4/2011 Apparao et al. .................. 726/1
2012/0226858 A1* 9/2012 Steitz et al. .................... 711/117
2012/0246696 A1* 9/2012 Boukobza ......................... 726/1
2012/0303558 A1* 11/2012 Jaiswal ........................... 706/12

OTHER PUBLICATIONS

Gantenbein, Douglas. "Windows Phone 7: A Better Keyboard." Microsoft Research; Apr. 28, 2011. (3 pages).

Genzel, Dmitriy and Eugene Charniak. "Entropy Rate Constancy in Text." Brown Laboratory for Linguistic Information Processing, Department of Computer Science, Brown University; Providence, RI; 2002. (8 pages).

Patric Ostergard. "S-72.2410 More Applications." [Retrieved on Aug. 23, 2011]. Retrieved from the Internet <URL: http://users.tkk.fi/~pat/info07/slides13.pdf> (5 pages).

PMC Ciphers. "The Trojan-Horse-Proof Virtual Keyboard." PMC Ciphers; Jul. 2008. (6 pages).

Tones, Delfem F. M. "Entropy Text Analyzer." MIUP'2002, 2nd Portuguese National ACM Programming Contest; Portugal; 2002. (7 pages).

Wikipedia. "Entropy (information theory)." [Retrieved on Aug. 23, 2011]. Retrieved from the Internet <URL: http://en.wikipedia.org/wiki/Entropy_%28information_theory%29> (13 pages).

* cited by examiner

SELECTIVELY PROCESSING USER INPUT

TECHNICAL FIELD

This document generally relates to processing user input made to an electronic device.

BACKGROUND

Some computing devices receive user input and process the user input in order to provide text auto-completion, spelling correction, and grammar correction functionality. Such computing devices can also provide the user input as training data for text processing services that provide the functionality. A user may specify the user input with a virtual keyboard or using a speech recognition system. Textual content specified by the user input may be placed into a document during document composition, or into a field of a web form. The textual content may include non-prose text (e.g., credential data that includes a seemingly random collection of alphanumeric characters). The non-prose text may not be very helpful as training data for such text processing services. Further, the non-prose text may include information that the user may not want to share with such text processing services.

SUMMARY

This document describes selectively processing user input data that is provided to an electronic computing device. In general, a computerized system can receive text and can determine a randomness level (e.g., an entropy level) for portions of the text. Portions of the text that do not exceed a threshold randomness level may be available for transmission to a text processing service. Portions of the text that do exceed the threshold randomness level may not be available for transmission to the text processing service.

The text processing service may thus operate only on text that is likely to be "trainable"—i.e., sufficiently non-random text that can be expected to be received by the text processing service in the future, in the same or similar form, so that the text processing service can respond to the text in the future. At a threshold point then, either by a sub-system that is part of the text processing service (e.g., a filter at the input to the service) or by a sub-system that is separate from the text processing service, text that is not trainable is prevented from reaching the text processing system by a filter.

The text that "passes" through the filter can then be provided for training in various manners, such as by identifying correlations between terms in various groups of text, correlations between terms used by objects that are linked to each other (e.g., web pages linked by URLs or users in a social network who are linked by relationships), correlations between terms entered in various fields (e.g., in an on-line form) and the labels for those fields, and in other various manners.

In general, one aspect of the subject matter described in this specification can be embodied in a computer-implemented method. The method includes receiving, by a computing system, text that represents content input by a user. The method includes determining, by a computing system, a randomness level for a portion of the text. The method includes determining, by a computing system, whether the randomness level for the portion of text exceeds a threshold level. The method includes responsive to determining that the randomness level does not exceed the threshold level, providing, by a computing system, the portion of text for processing by a text processing system.

This and other implementations can optionally include one or more of the following features. The method may further include receiving, by a computing system, the input by the user. The text may be generated by a speech recognition system based on audio input by the user. The method may further include receiving, by a computing system, the audio. The randomness level may be expressed as an entropy value in bits per character of the portion of text. The method may include identifying, by a computing system, whether the portion of text is a contiguous set of characters that are without intervening spaces and that are bounded by spaces. The method may include identifying the threshold level as a result of determining that the portion of the text satisfies a first criterion. Determining that the portion of the text satisfies the first criterion comprises determining that the portion of the text includes only hexadecimal characters.

The method may include identifying the threshold level based by determining that a property of an application program in which the user provided the input satisfies a second criterion. Determining that the property of the application program satisfies the second criterion may include determining that the portion of the text includes text provided in a field that is identified as being used for providing a password. Determining that the property of the application program satisfies the second criterion may include determining that the portion of the text includes text provided in a field that receives a maximum quantity of characters that is identified as being less than a threshold quantity of characters. Determining that the property of the application program satisfies the second criterion may include determining that the portion of the text is displayed to the user as masked characters. The processing by the text processing system may include execution of a spell checking procedure.

The processing by the text processing system includes execution of a word auto-complete procedure. The processing by the text processing system includes training a language model. The language model may be used for a procedure selected from a group consisting of speech recognition, word spell checking, and word auto-completion.

Another aspect of the subject matter described in this specification can be embodied in a computer-implemented system. The system includes one or more computer readable storage devices comprising instructions. The system includes one or more processors configured to execute the instructions to perform operations. The operations include receiving input of first text from a user. The operations include determining a randomness level for the first text. The operations include in response to determining that the randomness level for the first text does not exceed the threshold level, sending the first text to a text processing system. The operations include receiving user input of second text. The operations include determining a randomness level for the second text. The operations include, in response to determining that the randomness level for the second text does exceed the threshold level, precluding the system from sending the second text to the text processing system.

This and other implementations can optionally include one or more of the features of the above-described method.

In yet another aspect, the subject matter described in this specification can be embodied in a computerized system. The system includes a first computing subsystem that is configured to receive text that represents content of input provided by a user, parse the text into multiple different portions of the text, and provide the multiple different portions to another subsystem for analysis. The system includes a second computing subsystem that is configured to repeatedly receive a portion of text from the first computing subsystem, determine a level of randomness of the received portion of text, and provide the determined level of randomness to yet another subsystem for analysis. The system includes a third computing subsystem that is configured to repeatedly receive from the second computing subsystem a determined level of randomness of a received portion of text, determine whether the determined level of randomness for the received portion of text exceeds a threshold level of randomness, and provide portions of text with randomness levels that do not exceed the threshold randomness level to a text processing system and to not provide portions of text with randomness levels that do exceed the threshold level of randomness to the text processing system.

This and other implementations can optionally include one or more of the following features. The first computing subsystem may be configured to parse the text into multiple different portions of the text by performing a sliding window parsing operation on the text in order to generate portions of text that are of a same size and so that a character in the text is included in more than one of the multiple different portions of the text. The system may further include the text processing system, wherein the text processing system may be configured to receive from the third computing subsystem the portions of text that have been determined to not exceed the threshold randomness level.

Particular implementations can realize one or more of the following advantages. A text analysis system can prevent text that satisfies a certain criterion from being used as training data for a text processing system. As a result, the text processing system may provide enhanced service. Further, the text analysis system can prevent text that satisfies the certain criterion from being sent for processing by the text processing system. As such, textual processing may not be performed on text that satisfies the criterion (e.g., spell check may not be performed on complex hexadecimal strings). Moreover, users can continue to receive the benefits of the text processing system while sensitive data may not be transmitted to the text processing system.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
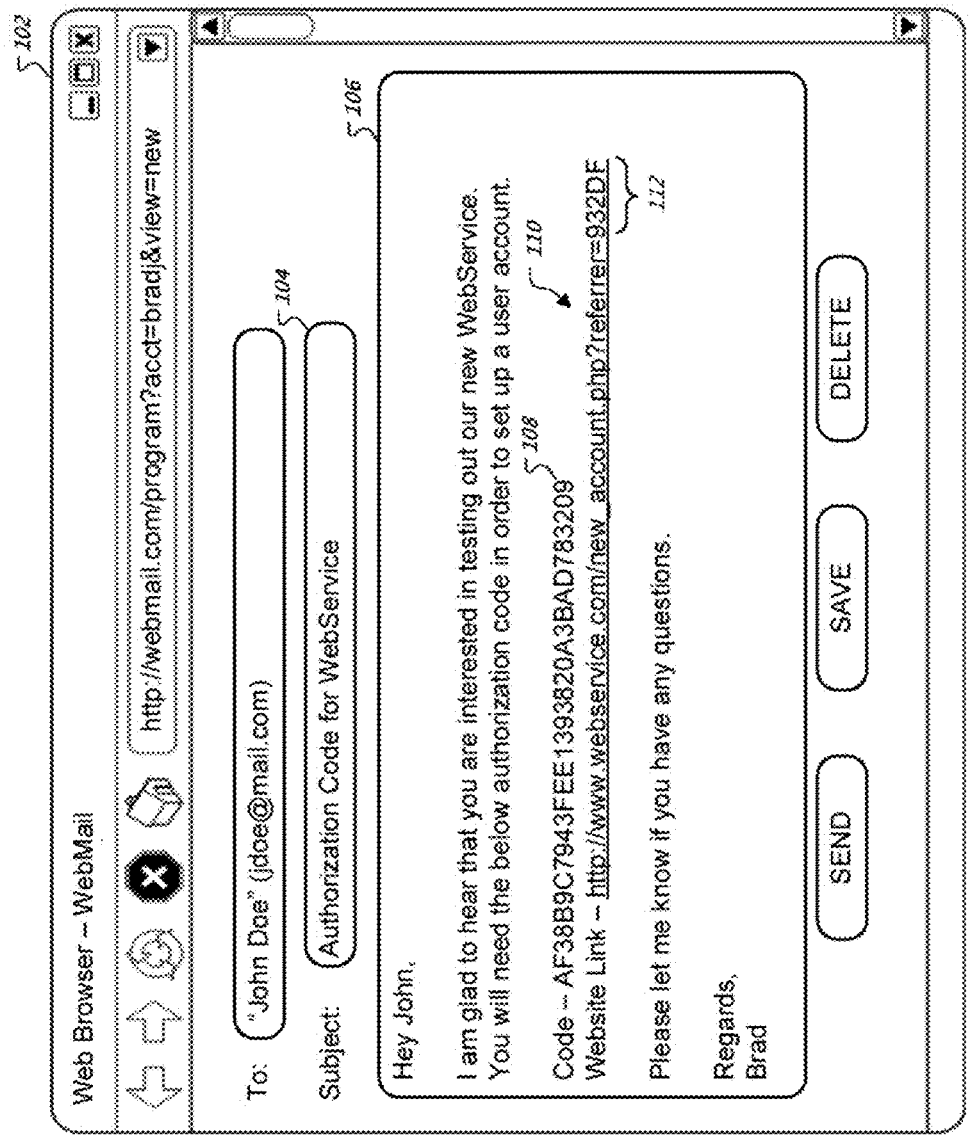
FIG. 1 shows a display of a web page on which a user has provided input.

This document generally describes selectively processing user input entered on a computer, such as a desktop computer, smartphone, or television-based computing device. Computerized devices can analyze text that is specified by a user in order to provide valuable services to the user, such as word auto-completion, word spell checking, word grammar checking, and query suggestions. These services may rely on language models that identify words and their frequency of use by a population.

The language models may be trained on large amounts of user data in order to generate language models that provide improved user service. Such user data can include the data that is provided for word auto-completion, word spell checking, word grammar checking, and query suggestions. For example, selections that a user makes in response to suggestions from the system can be used to infer that the selected suggestion is a better suggestion than unselected suggestions, and a learning system may, over time, promote such selected suggestions over unselected suggestions. Users of the computerized devices may need to consent to such collection of data in order to provide the valuable services to the user.

Users sometimes specify user input that includes non-prose data. Non-prose data may include credential data (e.g., passwords or complex identification strings) that provide little value for training text processing systems that provide the text processing services. For example, a user who has typed in "Ofice" may want to see the word "Office" appear for display as a suggested alternative word instead of the non-prose text "OFA1E."

Further, although users may permit collection of user-specified data in order to improve the operation of a text processing system, the users may not wish that their computing devices transmit non-prose data to the text processing system. Regardless, users may type non-prose data into a normal data entry field (e.g., the body of an email). The normal data entry field may not be designated as a "password" field, and as such, the user's computing device may not normally be aware that the text is non-prose text and should not be sent to the text processing system.

Still, some non-prose text is associated with greater randomness in comparison to the randomness of prose text (e.g., ordinary English conversation). For example, Shannon's entropy quantifies a randomness value for text. The entropy rate of typical English text may fall between 1.0 and 1.5 bits per letter. A randomness of text may also be referred to as a level of disorder of the text or an unpredictability of the text. For example, text associated with a low randomness or entropy level is text that is predictable.

The computing device may determine the randomness of text that the user has specified, and may only send to the text processing system text that has a determined randomness level that falls below a randomness threshold value (e.g., 2.5 bits per letter). Accordingly, text that has a high entropy level may not be provided to the text processing system, either to train language models or to provide a service to a user (e.g., word auto-completion or spell checking), or both.

As an illustration, should a user type a seemingly random sequence of characters, the computing device may determine that the randomness of the sequence of characters exceeds a threshold value, and the computing device may not display a suggested spelling change for the sequence of characters (or multiple suggested spelling changes or completions after each character that the user types). As such, the computing device may not transmit the sequence of characters to a spell-checking system at a remote computing device, preserving the user's privacy should the sequence of characters include credential data.

In some examples, the computing device analyzes the text in chunks of characters that each consists of a contiguous (i.e., adjacent and not interrupted with spaces) set of characters that are bounded within the text by spaces. These chunks of characters are referred to within this disclosure as "words." Said another way, the text may be analyzed on a word-by-word basis.

In some examples, the computing device analyzes the text using a sliding window mechanism. For example, the computing device may parse through the text and analyze a set of N characters at a time (e.g., 8 characters at a time). The sliding window mechanism may cause the computing system to analyze a set of N characters at a first moment in time and shift one character down the text to analyze a next set of N characters at a second moment in time. In some examples, each set of N characters can include spaces. In other words, the sliding window mechanism may run the sliding window across the entire text regardless of the presence of spaces. In other examples, each set of N characters may be prevented from including spaces. As such, the computing device may run the sliding window separately across each word in the text.

Such a sliding window mechanism may be useful where part of a "word" includes non-prose content but the rest of the word includes content that is not necessarily non-prose content. For example, a URL that includes mostly English language components, with a single non-prose hexadecimal code appended to the end of the URL as a query parameter, may not have a randomness value that exceeds a randomness threshold. On the other hand, a set of N characters that includes most or all of the query parameter, by itself, may have a randomness value that exceeds the randomness threshold.

In some examples, the threshold value to apply to the portion of text is selected based on characteristics of the text or characteristics of the portion of text. For example, if the portion of text is identified as being a query parameter in a URL, the threshold value may be lower than for text that is included in the domain name part of the URL (or in text that is not in a URL). As such, the portion of text may more likely exceed the lowered threshold and thus may not be provided to the text processing system. A rationale is that some components of text are more likely to include non-prose content, and thus such components of text may be judged under different criteria for transmittal or non-transmittal to a text processing system.

In some examples, the threshold value to apply to the portion of text is selected based on characteristics of the application program in which the text was specified (e.g., the application program to which the text will be or has been provided). For example, text that is entered into a text entry field of limited length, a text entry field that is labeled as being for user specification of a "Password," or a text entry field in which the user input is masked (e.g., by displaying asterisks instead of the user input characters) may be text that is probabilistically more likely to include credential data. As such, the threshold that is selected for application to text in a field with such characteristics may be lower than a threshold that is selected for application to text that is not identified as being in a field with such characteristics.

In response to determining that a portion of text exceeds a threshold value, the computing device may not provide the portion of text to the text processing system. In some examples, the computing device may not provide an entire field of text from which a portion of text that exceeded a threshold value was extracted.

FIG. 1 shows a display of a web page on which a user has provided input. More particularly, FIG. 1 shows a web browser window 102 that is displaying a web page for a WebMail application program. In this illustration, user Brad is sending an email to another user John. Brad has typed text into the subject field 104 and the body field 106 of the Web-Mail application program.

Brad's computing device may analyze the text that Brad specifies and may send portions of the text to a text processing system in order to train the text processing system and provide Brad with text processing services (e.g., auto-completion and spell checking services). The body of Brad's email includes an authorization code 108 for the web service. The authorization code 108 may not be especially useful for training the text processing system. Further, the text processing system may not be able to provide valuable spell checking or word auto-completion options for the code 108. As such, the computing device may be configured so as to not send to the text processing system user-specified text that has characteristics similar to code 108. Further, Brad may prefer that the code 108 is not sent to the text processing system, even if Brad has opted into data collection for purposes of training and using the text processing system.

Similarly, the body 106 of the email includes a URL 110 that includes a value 112 of a query parameter. As discussed in detail later in this disclosure, the computing device may be configured to not provide either the entire URL or the query parameter value 112 to the text processing system because the query parameter value may be determined to include non-prose data.

Brad may send the email to user John. John may receive the email and decide to sign up for the web service. As such, John may copy the code 108 (e.g., by right clicking on the code and selecting "copy" from the resulting pop-up menu), select the link for the URL 110, and in response be shown the display of FIG. 2.

Figure 2:
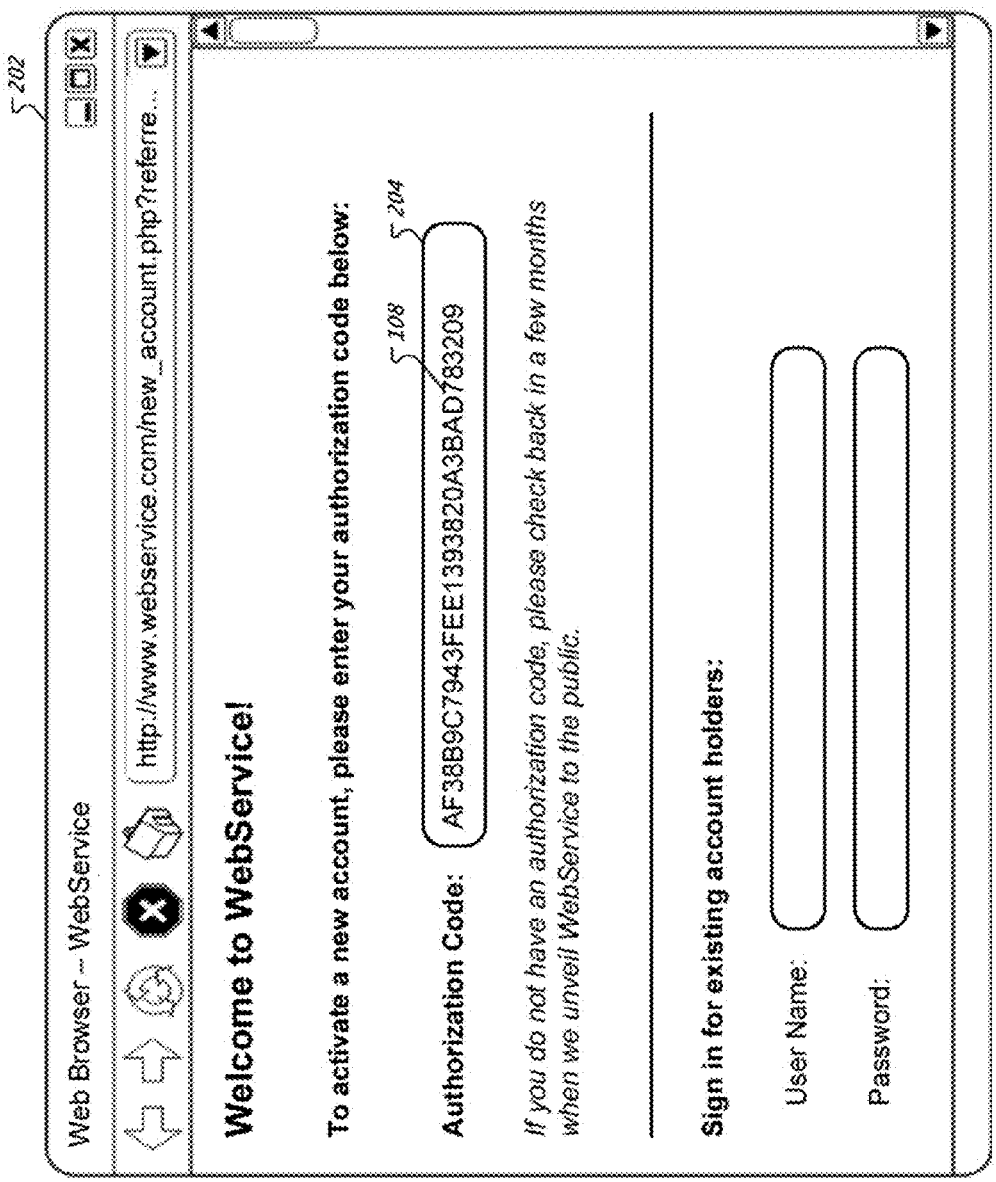
FIG. 2 shows a display of another web page on which a user has provided input.

FIG. 2 shows a display of another web page on which a user has provided input. In particular, FIG. 2 shows a web page 202 for activating a web service. In this example, John pastes the code 108 (which he had copied from the email that Brad sent him) into the authorization code field 204. As described throughout this disclosure and by the techniques described here, John's computing device might not provide the user-entered code 108 to the text processing system, for example, to train a language mode or to use for auto-complete or spell check text processing.

Figure 3:
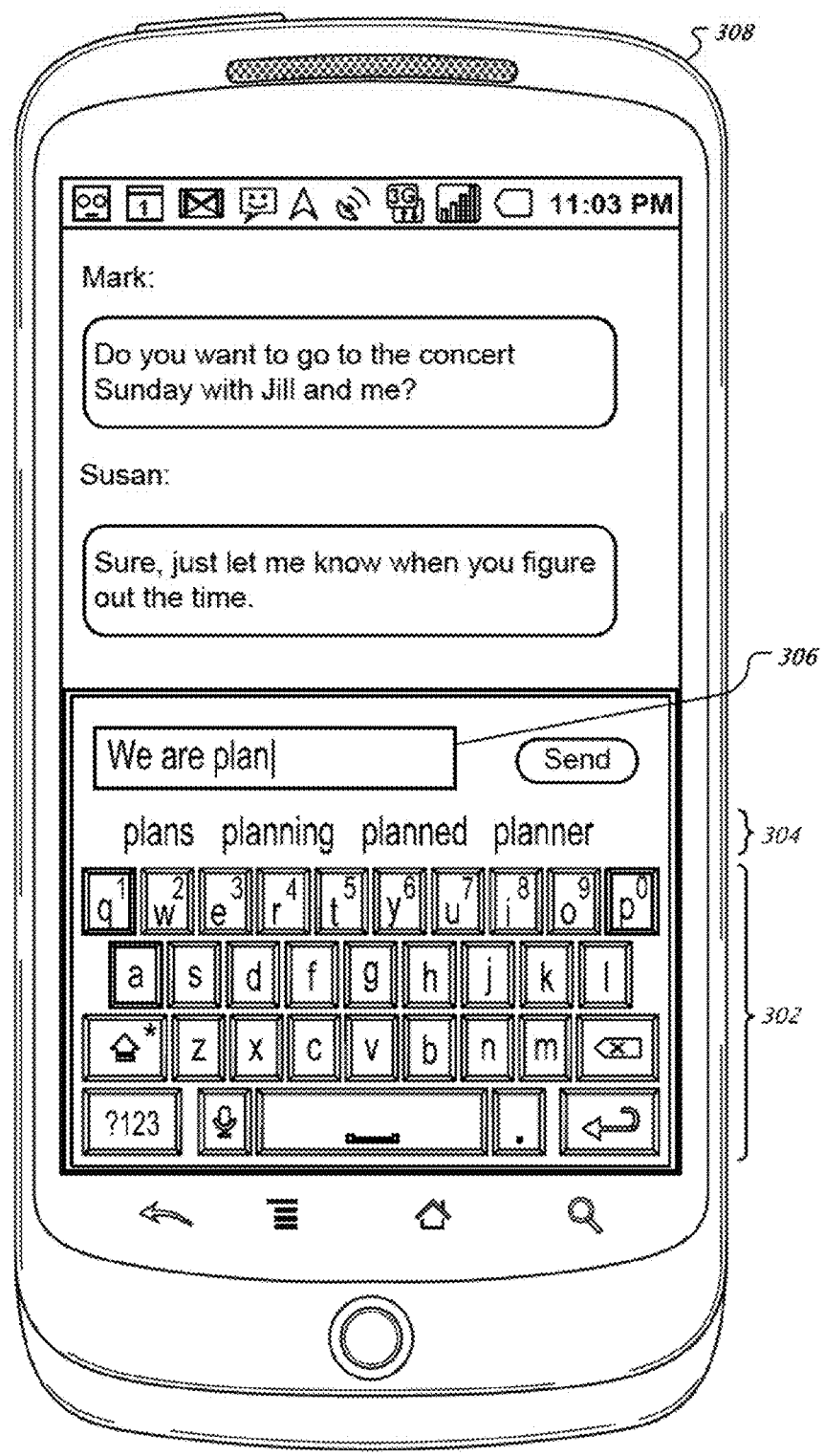
FIG. 3 shows a display of a mobile computing device on which a user has begun to enter a message.

FIG. 3 shows a display of a mobile computing device 308 on which a user has begun to enter a message. In particular, a user of the mobile computing device 308, Mark, has begun to type the message "We are planning to go at noon" in a text messaging application program. Mark uses the virtual keyboard 302 to type the message.

When Mark types the first four letters of the world "planning" (i.e., the four letters "plan"), the mobile computing device 308 may suggest multiple options 304 for completing the word. John may select one of the options (e.g., by tapping on the respective word) to replace the partial word "plan" with the selected word. As described throughout this disclosure, John's mobile computing device 308 may analyze the characters that John types into the text message entry field 306 in order to extract text for processing by a word auto completion service, and for determining whether to pass the text to the service.

Figure 4:
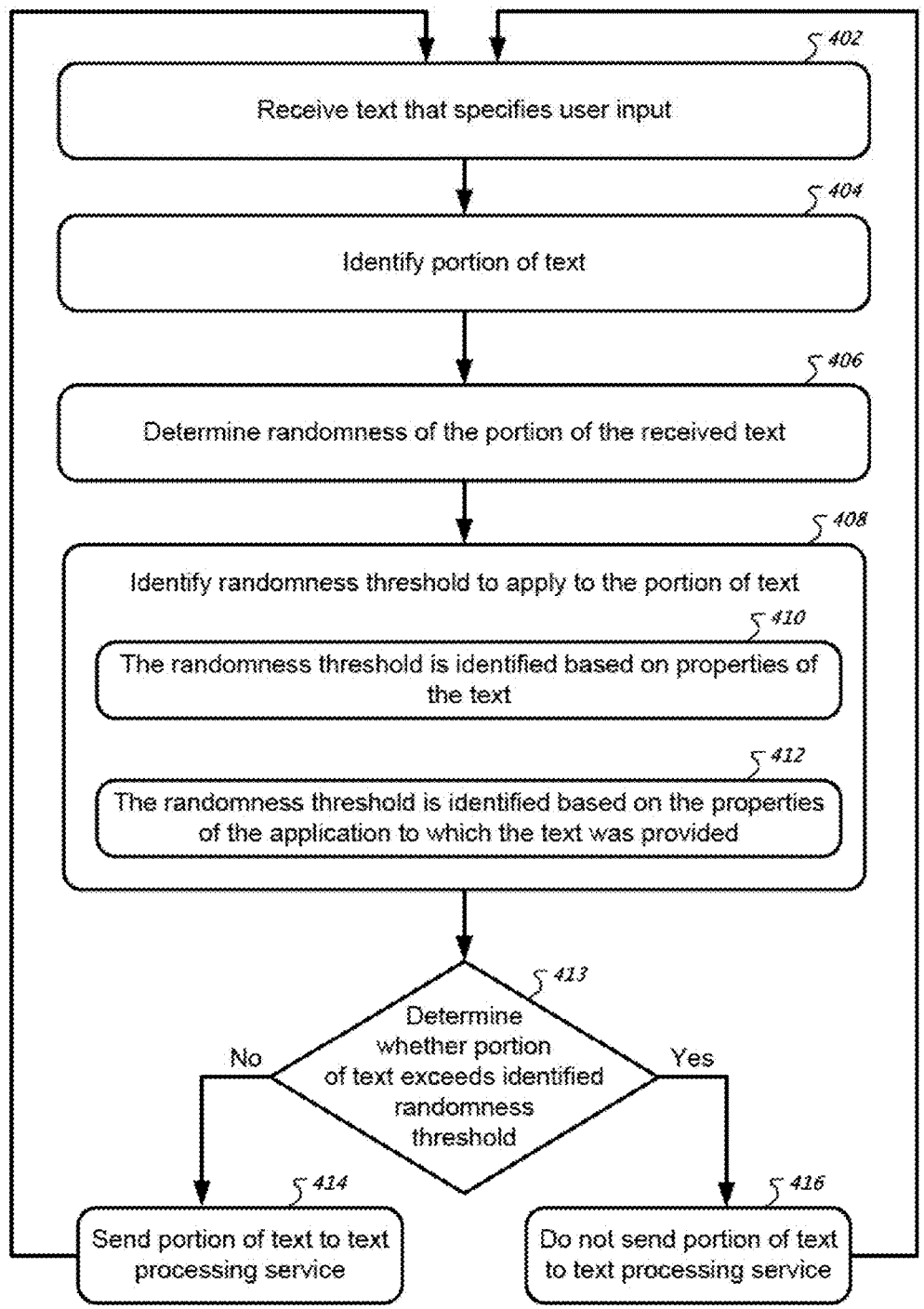
FIG. 4 shows a flowchart of an example process for selectively processing user input.

FIG. 4 shows a flowchart of an example process for selectively processing user input. The process can be performed, for example, by the system that is described with respect to FIG. 6.

In box 402, a computing system receives text that specifies input entered by a user. The text may have been entered by the user of the computing system or another computing device on a physical keyboard or a virtual keyboard. The text may be text that was generated by a voice recognition system in response to the voice recognition system receiving spoken audio that was provided by a user of the computing system or another computing device. In such an example, the text generated by the voice recognition system probabilistically represents the content of the spoken audio.

The text may be received in a stream of text. The stream of text may arrive character-by-character, word-by-word, or in groups of "N" characters as the text is entered by the user. In some examples, the text is received upon occurrence of a particular user event (e.g., user completion of a sentence or a line break) or upon occurrence of a particular time event (e.g., every one second).

FIGS. 1-3 provide examples of such user specified text. For example, in FIG. 1, user Brad specified text for display in the subject line field 104 and the message body field 106 using a physical or virtual keyboard. The text in the message body field 106 includes non-prose text (e.g., a hexadecimal code 108 for activating a web service and a value 112 of a query parameter). In FIG. 2, user John has received the email from Brad and has copied the code 108 into the text entry field 204 as user specified text. In FIG. 3, user Mark is typing the user specified text "We are plan" into the text entry field 306. User specified text may be text that a user specifies with user input, for example, with touch or verbal commands. Example user specified text includes text specified by a user with a keyboard, text generated by a voice recognition system based on words that have been verbally stated by a user into a microphone, and text pasted into a field with a user input command (e.g., CTRL-V or selecting "Paste" from a menu of text actions).

In box 404, the computing system identifies a portion of the text. As described below with reference to box 406, the computing system determines a randomness level of the identified portion of text. In some examples, the portion of text is a most recently received portion of text from a stream of portions of text. For example, the portion of text may be a single word that is received in stream of words.

In some examples, the computing system receives a string of text (e.g., multiple words or sentences) and identifies a portion of the string for analysis. The computing system may identify the portion of text, from the string of text, in various manners. In some examples, the computing system identifies the portion of text as a word in the string based on parsing the string into its component words. Said another way, the computing system may receive a string and may determine the randomness level of the first word in the string, then the second word in the string, and so forth until all words in the string have a determined randomness level. A word is a contiguous set of characters that are separated from the remaining text by bounding delimiting characters (e.g., spaces).

In some examples, the computing system identifies the portion of text using a sliding window mechanism. For example, the computing system may access a string of text and may identify characters 1 through N of the text as the portion of text. The computing system may then identify characters 2 through N+1 of the text as the next portion of text. The computing system may then identify characters 3 through N+2 of text as the next portion of text, and so forth until the computing system has identified a portion of the text that includes the last character in the text. In other instances, the window may move more than one character between each analysis. Also, in different implementations, the sliding window may have differently fixed widths, or in a particular implementation, the width of the sliding window may change depending on context (e.g., the sliding window may have a different width depending on the label of a field that is being analyzed).

The use of a sliding window mechanism may be beneficial because a word may include a subset of the word that includes non-prose text. For example, the URL 110 includes a query parameter value 112 that is non-prose text. A computing system with a sliding window mechanism (e.g., one with a five character sliding window) may identify the query parameter value 112 as having a high randomness level. On the other hand, if the computing system analyzes the entire link 110 as a single portion of text, the determined randomness level may be lower (and thus the coded data may not excluded from transmission to a text processing system).

In some examples, the computing system separates words in the received text into portions based on predefined separation heuristics. For example, the computing system may separate a textual word that includes an "@" symbol and ends with ".com" into a username portion and a domain name portion at predefined non-alpanumeric characters.

In box 406, the computing system determines the randomness of the identified portion of the received text. For example, the computing system may determine an entropy level (e.g., based on Shannon's entropy calculation) of the portion of the received text. Textual prose may have fairly low entropy. In other words, prose text is fairly predictable. Even if one does not know the character that is going to come next in a sequence of characters, one can be fairly certain that, for example, there will be many more e's than z's, and that the combination 'qu' will be much more common than any other combination with a 'q' in it. A randomness level of a portion of text can indicate a probability that characters are adjacent to each other. In some examples, the entropy of textual English is between 0.6 and 1.3 bits per characters. "N" bits per character can mean that one can identify the value of a character by asking "N" questions. "N" bits per character can also be a compression ratio of text. In some examples, the entropy of a portion of text may be determined by the formula:

$$E_T(P_1, \ldots, p_n) = \frac{1}{\lambda} \sum_{i=1}^{n} p_i [\log_{10}(\lambda) - \log_{10}(p_i)]$$

where $p_i$, i=1, ... n, is the frequency of each i-word in the portion of text T. That is, $p_i$ is the number of times that the i-word happens to occur in the given portion of text. A portion of text of length $\lambda$ (e.g., a text with $\lambda$ words) may be richer as the number of different words (n) increases.

The expected entropy for text may be different for different languages. Moreover, the computing system can identify a language of user specified text, and can select a language model that is specific to the identified language from a collection of language models for respective languages. Each of the language models can include information that identifies probabilities that characters in each particular language may be found adjacent to each other in a portion of text. The computing system can use the probability information in the selected language model in order to identify the entropy of the user specified text. Further, probability information that is based on the content of a user's textual or verbal input history can be used by the computing system to identify the entropy of the user-specified text.

In box 408, the computing system identifies a randomness threshold to apply to the portion of text. In some examples, the computing system identifies a predetermined threshold to which the randomness level that was determined for the portion of text is compared. The predetermined threshold may be 3.2 bits per character. The predetermined threshold may be provided by a developer of the computing system based on an analysis of randomness levels of credential data and randomness levels of English prose.

In box 410, the computing system identifies a randomness threshold based on properties of the text. The computing system may be able to select a randomness threshold from a collection of randomness thresholds based on the portion of text meeting a criterion. In some examples, if the computing system determines that the portion of text includes only hexadecimal characters, the computing system may select a first randomness threshold. The first randomness threshold may be lower than a randomness threshold for text that includes characters that are not hexadecimal. The hexadecimal nature of the portion of text may indicate that the text is more likely to represent non-prose content. Thus, the computing system may lower the threshold so that the hexadecimal information is more likely to be identified as non-prose text.

The computing system may select a second randomness threshold if the portion of the text includes a word that includes both alphabetical and numeric characters. The computing system may select a third or a fourth randomness threshold based on a determined language of the text or the portion of text. In some examples, if the computer system separated the portion of text from the string based on a heuristic (as discussed with reference to box 404), the computing system may label the separated portion of text as of a particular type, and may apply a threshold that is specific to the type of text. For example, a fifth threshold may be identified for text that represents a domain name of an email. A sixth threshold may be identified for text that represents a username of an email address. Similar thresholds can apply to portions of text that have been identified to be a physical address, phone number, and proper names, for example.

In box 412, the computing system identifies a randomness threshold based on the properties of the application to which the text was provided. For example, the computing system may apply a seventh threshold if the text was specified using a voice query, an eighth threshold if the text was specified using a physical keyboard, and a ninth threshold if the text was specified using a virtual keyboard. The computing system may apply a tenth threshold if the text was specified in a text entry field that masks characters (e.g., by displaying asterisks instead of the characters that are typed) and an eleventh threshold if the text entry field is below a determined maximum character quantity. Both criteria may indicate that the field is more likely to receive non-prose text.

The computing system may apply a twelfth threshold if the text entry field is labeled (e.g., with an XML tag) as being for a "password" or is labeled with another label that indicates that the field is used to receive credential data in distinction to other types of data. The computing system may apply a thirteenth threshold if the text entry field in which the text was specified restricts characters of the user's input (e.g., the user must enter at least one number and at least one non-alphanumeric character). In some examples, a fourteenth threshold is identified if the text was pasted into a text entry field instead of the text being specified character-by-character by the user.

In box 413, the computing system determines whether the portion of text exceeds the identified randomness threshold. For example, the computing system compares the randomness value (also referred to herein as a randomness "level") that was determined for the portion of text to the randomness threshold that was selected for the determined portion of text. If the randomness value does not exceed the randomness threshold (e.g., if the determined randomness value was below the threshold value) then the portion of text is sent to a text processing service (box 414). If the randomness value exceeds the randomness threshold (e.g., if the value is above the threshold value) then the portion of text is not sent to the text processing service (box 416). In other words, a transmission of the portion of text to the text processing service may be cancelled or prevented.

In some examples, if a portion of text is identified as exceeding a randomness threshold, text other than the portion of text is also not sent to the text processing service. For example, all of the user specified text that was entered into the same text entry field as the portion of text may be precluded from being sent to the text processing service (e.g., by not providing an instruction to send the text to the text processing service). In some examples, an entire "word" may not be sent to the text processing service even though only a portion of the word was determined to exceed an identified randomness threshold (e.g., as in the example of FIG. 2 where the URL 110 includes a query parameter value 112).

The text that is sent to the text processing system may be used to train the text processing system (e.g., by updating frequency data and word or character co-occurrence data in a language model) and/or may be used as input to a runtime process of the text processing system. Such runtime processes may include word suggestion for partially completed words, spelling correction for completed words, query suggestion for partially or fully entered search queries, and modification to key contact areas on a dynamically adjusting virtual keyboard based on input character sequences, for example.

In some examples, upon the performance of the operations of either box 414 or box 416, the process begins anew at box 402. In examples where the computing system received a string of text (box 402), identified a single portion of text from the received string of text (box 404), and processed the single portion of text (boxes 406-416), the computing system may not again perform the operations of box 402 until each portion of text in the string has been identified and processed. In other words, the system may "consume" all of the received string of text using the process of boxes 404 through 416 before another string of text is received. In some examples, the operations of box 402 are performed independently of the operations of boxes 404 through 416. The operations of box 402 may fill a buffer with received data while the operations of boxes 404 through 416 may cycle as the operations consume the received data.

Figure 5:
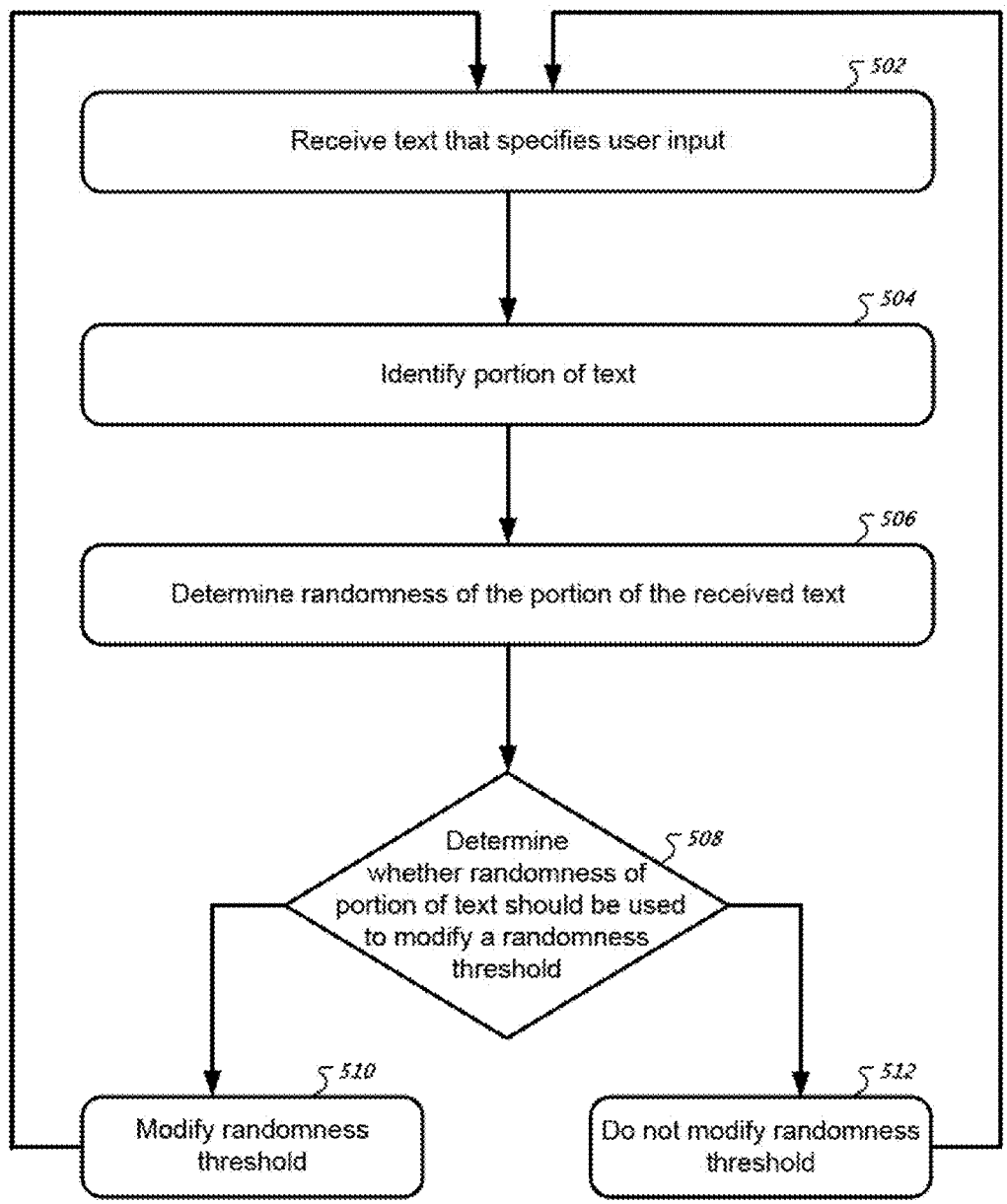
FIG. 5 shows a flowchart of an example process for modifying a randomness threshold.

FIG. 5 shows a flowchart of an example process for modifying a randomness threshold. In such a process, a randomness threshold may be used to determine whether a portion of text should be sent to a text processing system (e.g., as described with respect to box 408). The randomness threshold can be determined by a computing system based on text that is entered into one or more computerized devices over a period of time. For example, the randomness levels for text that is received in large text entry fields that include few restrictions on textual content may be used as a representation of the randomness of prose textual content. On the other hand, the randomness levels for text that satisfies any of multiple criteria may be used as a representation of the randomness of non-prose textual content. Example criteria include the text being entered into a field that is labeled as being for a "password," text being entered into a field in which the entered text is displayed as masked characters, text being entered into a field that includes restrictions on the entered text, the text including specified non-alphanumeric characters (e.g., "@" or "#"), and the text including only hexadecimal characters.

For example, in box 502, the computing system receives text that specifies user input (e.g., as discussed with reference to box 402).

In box 504, the computing system identifies a portion of the text (e.g., as discussed with reference to box 404).

In box 506, the computing system determines the randomness of the portion of the received text (e.g., as discussed with reference to box 406).

In box 508, the computing system determines whether the randomness level of the identified portion of text should be used to modify a randomness threshold. For example, if the identified portion of text is from a field that is labeled "password" and that masks the characters typed into the field, the computing system may use the determined randomness level for the portion of text to modify the randomness threshold (box 510). The randomness level for the portion of text may be used as a weighted component of the randomness threshold. If the identified portion of text is from a field that does not have length or content restrictions, the identified portion of text may not be used to modify the randomness threshold (box 512).

In various examples, all text is used to modify the randomness threshold. For example, probabilistically determined prose text (e.g., based on the text being entered in a large field without restrictions) may weigh the threshold downwards while probabilistically determined non-prose text may weigh the threshold upwards.

In some examples, the determined randomness levels of portions of text are generated by multiple computing devices and are transmitted to a centralized threshold determining system. The portions of text, however, may not be sent to the threshold determining system. For example, the threshold determining system may receive data that indicates that a portion of text was entered into a field labeled "password," and that the randomness level of the text in the field was 3.4 bits per character. The threshold determining system, however, may not receive the content of the field (e.g., because the content was excluded from transmission to any remote computing device by the operations of box 416). Thus, a text processing system may not receive text that is determined to include non-prose content, but may receive data that enables the text processing system to refine threshold levels for determining whether subsequently received text includes prose or non-prose content.

Figure 6:
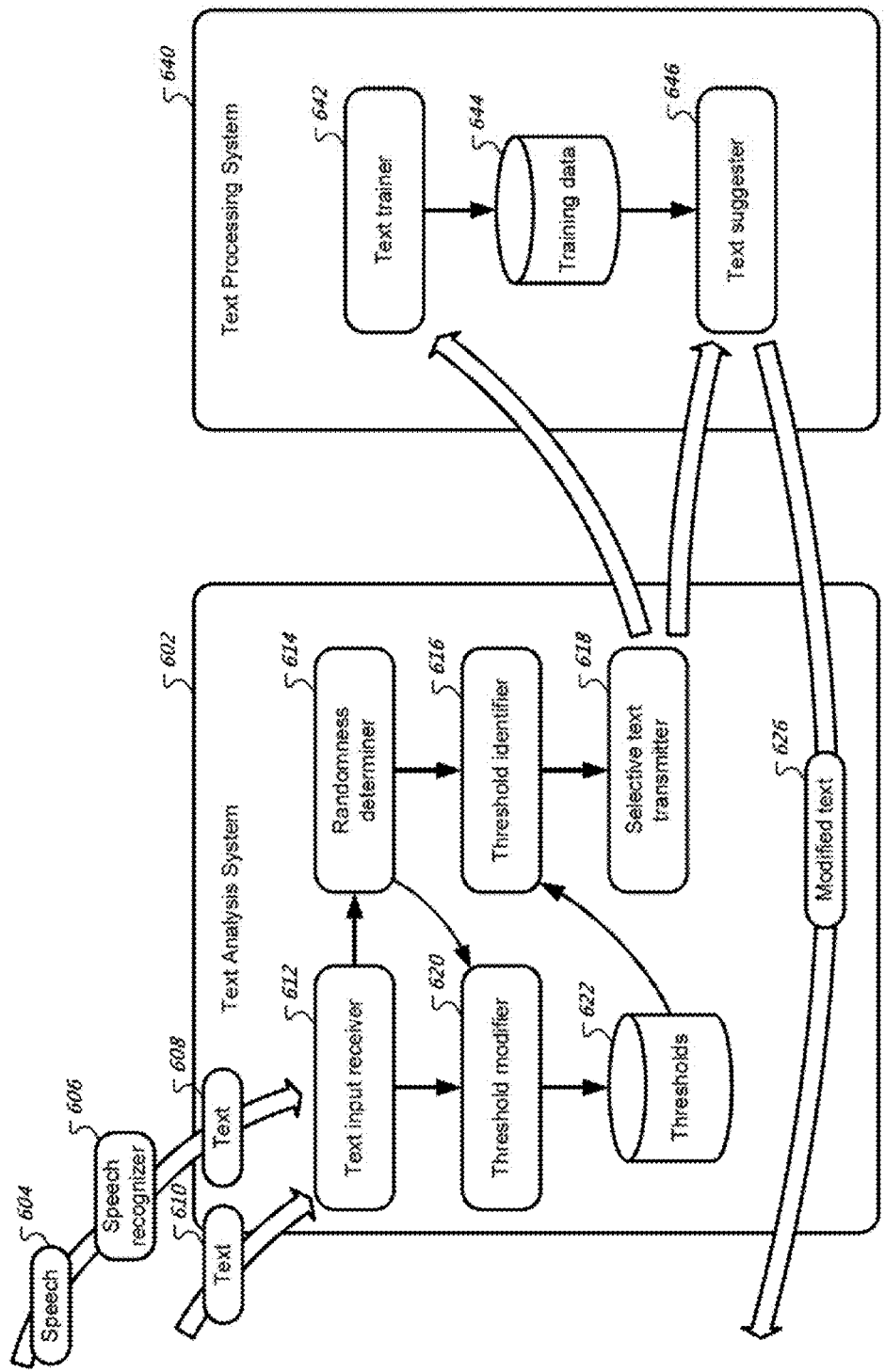
FIG. 6 shows a diagram of an example system for selectively processing user input and modifying a randomness threshold.

FIG. 6 shows a diagram of an example system for selectively processing user input and modifying a randomness threshold. In general, a text analysis system 602 receives text 608 or 610. A randomness determiner 614 determines the randomness of the received text, and, if the text does not exceed a threshold of randomness, the selective text transmitter 618 transmits the text to a text processing system 640. A text trainer 642 at the text processing system 640 can use the received text to generate training data 644. A text suggester 646 at the text processing system 640 can used the received text to suggest modified text 626 (e.g., words with corrected or suggested spelling) for use by the user's computing system.

In some examples, the text processing system 640 may be provided by a server system. The server system may receive transmissions from multiple computing devices at which users specified user input text or audio. The text processing system 640 may be able to access training data 644 that was specified by multiple different users of multiple different computing devices. The training data 644 may not be accessible to the multiple different computing devices.

In some examples, the text analysis system 602 may be provided by individual computing devices at which users specify user input text or audio. The text analysis system 602 may be provided by an individual computing device when the text is entered using a keyboard or a soft keyboard of the individual computing device.

The text analysis system 602 may alternatively be provided by a server system. The text analysis system 602 may be provided by a server system when the text is generated from a speech recognizer 606. The speech recognizer 606 may reside at the server system, so operation of the text analysis system 602 by the server system may provide computational efficiencies. The specific details of the text analysis system 602 and the text processing system 640 are discussed as follows.

The text input receiver computing subsystem 612 receives text 608 or 610. The text 610 may be received from an interface that identifies key presses of a physical or virtual keyboard. The text 608 may be received from a speech recognizer computing subsystem 606. The speech recognizer 606 may receive an audio file of speech 604 and may generate the text 608 from the audio file. The text 608 or 610 may be in binary or ASCII format, for example. The text input receiver 612 may perform at least some of the operations that are described with respect to box 402.

The text input receiver 612 may provide the received text to a randomness determiner computing subsystem 614. The randomness determiner 614 may determine randomness levels for portions of the received text. For example, the randomness determiner 614 may parse the text into component parts (e.g., words of the text or overlapping chunks of the text identified using a sliding window technique) and may determine the randomness level of the component parts of the text. The randomness level of the component parts may be determined by applying an entropy determining function to determine the Shannon entropy of each part. The randomness determiner 614 may perform at least some of the operations that are described with respect to boxes 404 and 406.

The threshold identifier computing subsystem 616 may identify the threshold to apply to the determined randomness level for each of the component parts. In some examples, the text analysis system 602 has a single threshold to which randomness levels are compared. In such examples, the threshold identifier 616 may perform the simple task of retrieving the single threshold from computer memory.

In some examples, the threshold identifier 616 identifies one or more of multiple thresholds 622 to which randomness levels are compared. For example, the threshold identifier 616 may use different thresholds for different portions of text based on characteristics of text entry fields in which the portions of text were specified, based on a language of the text, or based on whether the text includes content of a predetermined and limited character set (e.g., whether the text includes only hexadecimal characters). The threshold identifier 616 may perform at least some of the operations that are described with respect to boxes 408, 410, and 412.

The selective text transmitter computing subsystem 618 determines whether portions of text exceed or fall beneath their respectively identified randomness thresholds. If the determined randomness level for a portion of text exceeds its respectively identified randomness threshold level, then the portion of text may not be transmitted to the text processing system 640. If the determined randomness level for a portion of text does not exceed its respectively identified randomness threshold level, then the portion of text may be transmitted to the text processing system 640. The selective text transmitter 618 may perform at least some of the operations that are described with respect to boxes 413, 414, and 416.

The text processing system 640 may include a text suggester computing subsystem 646 that uses the received text to provide text suggestions. The text processing system 640 may further or alternatively include a text trainer computing subsystem 642 that uses the received text to generate training data 644 (e.g., where generate training data is training data that has been updated based on received text).

The text suggester 646 receives portions of text from computing devices and determines whether to suggest changes in the portions of text. Such a change can include a suggested spelling correction or a suggested word completion. For example, the text suggester 646 may receive from the selective text transmitter 618 a portion of text that includes multiple words. The text suggester 646 may access a dictionary of correctly spelled words to determine those words that are not listed in the dictionary of correctly spelled words. For the remaining words which may be misspelled, the text suggester 646 may suggest alternative spellings for the words. The training data 644 may include frequency information for words, and accordingly may be used to identify the "popularity" of words that are determined by the text suggester 646 to be similar in spelling to an incorrectly spelled word. A most "popular" of the words may be transmitted for receipt by the computing system at which the user input was specified. In some examples, portions of text received by the text suggester 646 include partial words and the text suggester 646 combines many of the partial words into a string of characters in order to identify whether a word in the string was correctly spelled.

In some examples, the text suggester 646 uses the frequency data for words in the training data 644 to identify suggested auto complete words for words that a user has partially specified. Other example uses of the training data 644 are described throughout this disclosure. For example, the training data 644 may be used to perform a speech recognition process.

The text trainer 642 receives portions of text from the selected text transmitter 618. The text trainer 642 may receive the portions of text from multiple selective text transmitters 618 at multiple respective computing devices. The text trainer 642 uses the content in the received portions of text to update frequency data for words in the training data 644. The training data 644 may include an n-gram model. In some examples, portions of text that are transmitted from the selective text transmitter 618 to the text processing system are transmitted to both the text trainer 642 and the text suggester 646. In some examples, transmitted portions of text are transmitted to only one of the text trainer 642 and the text suggester 646.

The text suggester 646 transmits suggested changes in the text 608 or 610 as modified text 626. In some examples, the modified text 626 is transmitted for receipt by a computing device at which the user provided the user input that specified the text 608 or 610. The computing device may display the modified text 626 to the user, for example, as an option for completing a word or changing the spelling of a word. In some examples, the computing device may automatically change the text 608 or 610 to include the modified text 626 without user input.

In various examples, the text analysis system 602 or the text processing system 640 includes a threshold modifier 620. The threshold modifier 620 may receive from the randomness determiner 614 the determined thresholds for portions of text. The threshold modifier 620 may also receive indications of characteristics of the text or indications of characteristics of an application program in which the text was specified by a user (e.g., characteristics of a field in which the text was entered). The threshold modifier 620 may use such information to modify one or more thresholds 622 for use by the threshold identifier 616.

For example, the threshold modifier 620 may receive determined randomness levels for text that was entered in text fields that mask the characters of the text. Such masking may indicate that the text is credential non-prose data. Accordingly, the randomness levels for such text may be used to at least partially weight a threshold level that can probabilistically separate prose text from non-prose text. The threshold modifier 620 may perform at least some of the operations that are described with respect to boxes 508, 510, and 512.

In various examples, characteristics of the text or the application in which the text was entered may be used to determine whether the text is transmitted for receipt and processing by the text processing system 640 without a determination of the randomness of the text or a comparison of a randomness level to a randomness threshold. For example, a computing system may determine whether text was entered into text field that includes any combination of the following characteristics: the text field is labeled as being for credential data, the text field masks the specified text, the text field has a companion text field in which the user may validate the content of the text field by entering a copy of the content of the text field, and the text field is associated with restrictions on the content of the text that may be entered into the text field. If the text field satisfies a predetermined combination of one or more of the described characteristics, the text in the field may not be transmitted to the text processing system 640. Otherwise the text may be transmitted to the text processing system 640.

Similarly, if text satisfies predetermined text format criterion, the text may not be transmitted to the text processing system 640. Otherwise the text may be transmitted to the text processing system 640. Example criteria include the text being in a format for a social security number (e.g., three numerical characters, a hyphen, two numerical characters, a hyphen, and three numerical characters), the text being in a format for a telephone number, the text being in a format of an email address (e.g., the portion of text includes an "@" symbol and ends with ".com," ".org," or ".edu," for example), or the text including all hexadecimal characters.

Figure 7:
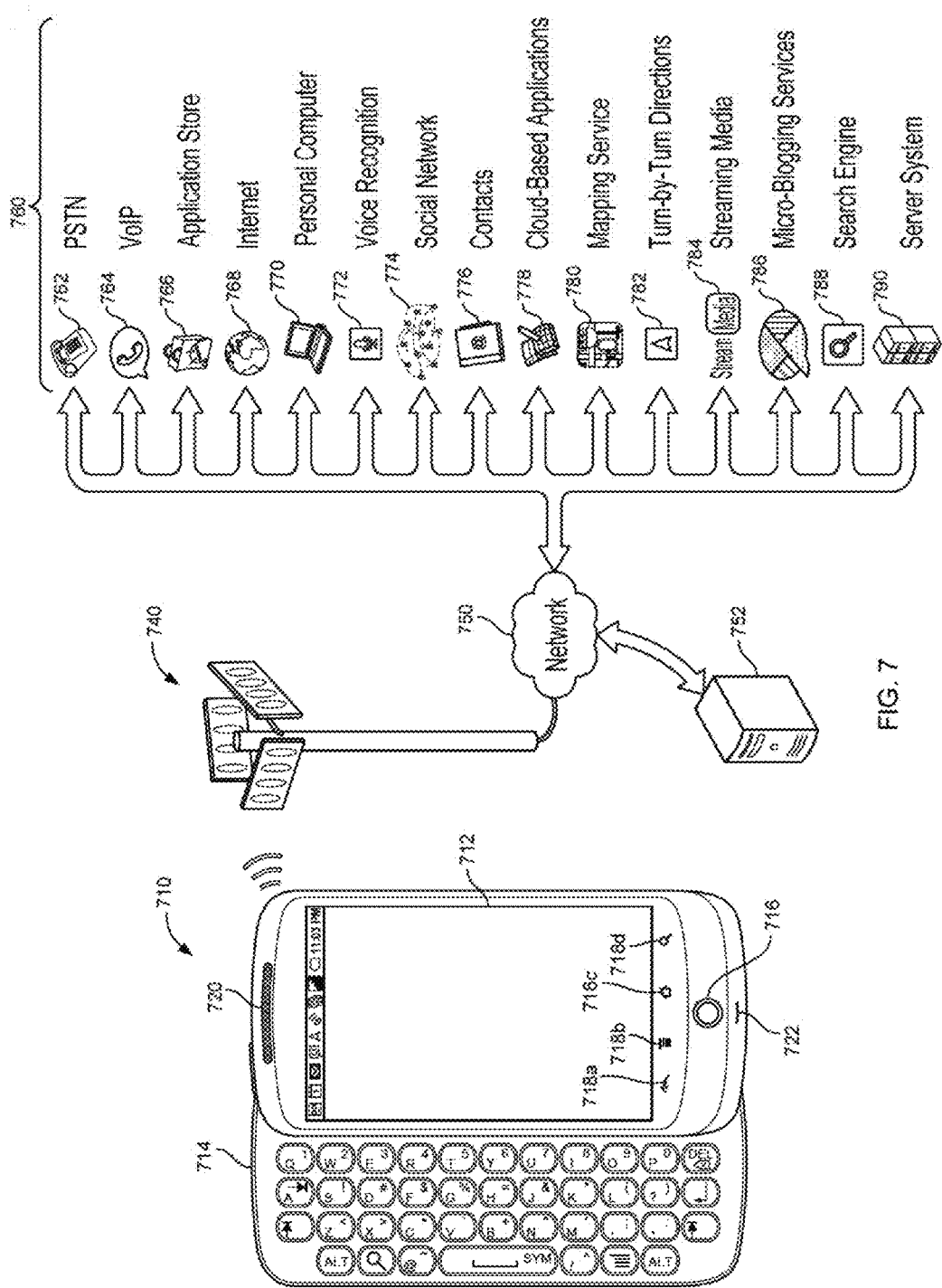
FIG. 7 is a conceptual diagram of a system.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or application telephone) that includes a touchscreen display device 712 for presenting content to a user of the mobile computing device 710 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 714, physical buttons, trackballs, accelerometers, gyroscopes, and magnetometers).

Example visual output mechanism in the form of display device 712 may take the form of a 3.7 or 4.3 inch LED or AMOLED display with resistive or capacitive touch capabilities, for displaying video, graphics, images, and text, and coordinating user touch input locations with the location of displayed information so that user contact at a location of a displayed item may be associated with the item by the device 710. The mobile computing device 710 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a track pad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user-selection of the "home" button 718c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user the capability to answer the incoming telephone call. A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 8:
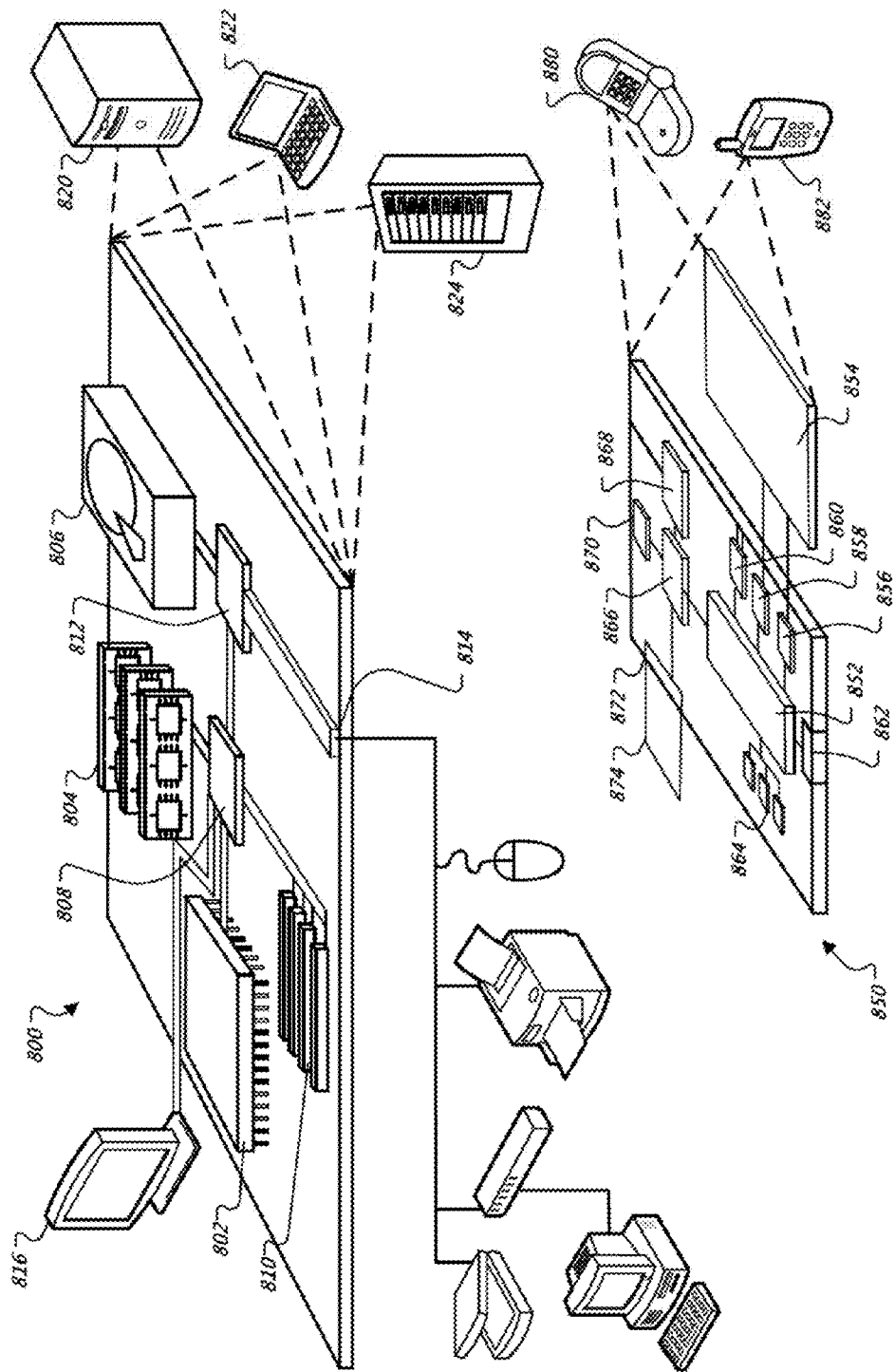
FIG. 8 is a block diagram of computing devices.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high-speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high-speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provided, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-topeer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing system, multiple portions of text that were input into different types of fields associated with a resource;
selecting (i) a first randomness threshold value for portions of text that are input into a text entry field of a first type, and (ii) a second randomness threshold value for portions of text that are input into a text entry field of a second type;
for each of the multiple portions of text:
determining, for the portion of text, a randomness value that reflects a level of entropy associated with a sequence of characters in the portion of text;
determining a type of text entry field into which the portion of text was input, from among the text entry field of the first type and the text entry field of the second type,
determining a randomness threshold value associated with the determined type of text entry field, from among the first randomness threshold value and the second randomness threshold value, where the randomness threshold value associated with the determined type of text entry field reflects a level of entropy permitted in a sequence of characters both input into a text entry field of the determined type and used to adapt a text processing system, and
determining whether the randomness value for the portion of text satisfies the determined randomness threshold value;
providing the one or more portions of text whose respective randomness values are determined to not satisfy the respective randomness threshold value determined for the portions of text, to adapt a text processing system; and
preventing the one or more portions of text whose respective randomness values are determined to satisfy the respective randomness threshold value determined for the portions of text, from being used to adapt the text processing system.

2. The computer-implemented method of claim 1, wherein the text entry field of the first type is a password entry field and the text entry field of the second type is a document body entry field.

3. The computer-implemented method of claim 2, wherein the first randomness threshold value is lower than the second randomness threshold value.

4. The computer-implemented method of claim 1, wherein selecting (i) a first randomness threshold value for particular portions of text that are input into a first text entry field of a first type, for credential data and (ii) a second randomness threshold value for particular portions of text that are input into a second text entry field of a second type for non-credential data comprises:
selecting the first and second randomness threshold values for respective particular portions based at least in part on restrictions of numbers of characters permitted in text entry fields in which the respective particular portions are input.

5. The computer-implemented method of claim 1, wherein selecting (i) a first randomness threshold value for particular portions of text that are input into a first text entry field of a first type, for credential data and (ii) a second randomness threshold value for particular portions of text that are input into a second text entry field of a second type for non-credential data comprises:
selecting the first and second randomness threshold values for respective particular portions based at least in part on whether or not user input is masked in text entry fields in which the respective particular portions are input.

6. The computer-implemented method of claim 1, wherein the first text entry field of the first type is a credential text entry field and the second text entry field of the second type is a non-credential text entry field.

7. A system comprising:
one or more computers; and
one or more storage devices storing instructions that are operable, when executed by the one or more computers, to cause the one or more computers to perform operations comprising:
receiving, by a computing system, multiple portions of text that were input into different types of fields associated with a resource;
selecting (i) a first randomness threshold value for portions of text that are input into a text entry field of a first type, and (ii) a second randomness threshold value for portions of text that are input into a text entry field of a second type;
for each of the multiple portions of text:
determining, for the portion of text, a randomness value that reflects a level of entropy associated with a sequence of characters in the portion of text;
determining a type of text entry field into which the portion of text was input, from among the text entry field of the first type and the text entry field of the second type,
determining a randomness threshold value associated with the determined type of text entry field, from among the first randomness threshold value and the second randomness threshold value, where the randomness threshold value associated with the determined type of text entry field reflects a level of entropy permitted in a sequence of characters both input into a text entry field of the determined type and used to adapt a text processing system, and
determining whether the randomness value for the portion of text satisfies the determined randomness threshold value;
providing the one or more portions of text whose respective randomness values are determined to not satisfy the respective randomness threshold value determined for the portions of text, to adapt a text processing system; and preventing the one or more portions of text whose respective randomness values are determined to satisfy the respective randomness threshold value determined for the portions of text, from being used to adapt the text processing system.

8. The system of claim 7, wherein the text entry field of the first type is a password entry field and the text entry field of the second type is a document body entry field.

9. The system of claim 8, wherein the first randomness threshold value is lower than the second randomness threshold value.

10. The system of claim 7, wherein selecting (i) a first randomness threshold value for particular portions of text that are input into a first text entry field of a first type, for credential data and (ii) a second randomness threshold value for particular portions of text that are input into a second text entry field of a second type for non-credential data comprises:
selecting the first and second randomness threshold values for respective particular portions based at least in part on restrictions of numbers of characters permitted in text entry fields in which the respective particular portions are input.

11. The system of claim 7, wherein selecting (i) a first randomness threshold value for particular portions of text that are input into a first text entry field of a first type, for credential data and (ii) a second randomness threshold value for particular portions of text that are input into a second text entry field of a second type for non-credential data comprises:
selecting the first and second randomness threshold values for respective particular portions based at least in part on whether or not user input is masked in text entry fields in which the respective particular portions are input.

12. The system of claim 7, wherein the first text entry field of the first type is a credential text entry field and the second text entry field of the second type is a non-credential text entry field.

13. A non-transitory computer-readable medium storing software comprising instructions executable by one or more computers which, upon such execution, cause the one or more computers to perform operations comprising:
receiving, by a computing system, multiple portions of text that were input into different types of fields associated with a resource;
selecting (i) a first randomness threshold value for portions of text that are input into a text entry field of a first type, and (ii) a second randomness threshold value for portions of text that are input into a text entry field of a second type;
for each of the multiple portions of text:
determining, for the portion of text, a randomness value that reflects a level of entropy associated with a sequence of characters in the portion of text;
determining a type of text entry field into which the portion of text was input, from among the text entry field of the first type and the text entry field of the second type,
determining a randomness threshold value associated with the determined type of text entry field, from among the first randomness threshold value and the second randomness threshold value, where the randomness threshold value associated with the determined type of text entry field reflects a level of entropy permitted in a sequence of characters both input into a text entry field of the determined type and used to adapt a text processing system, and
determining whether the randomness value for the portion of text satisfies the determined randomness threshold value;
providing the one or more portions of text whose respective randomness values are determined to not satisfy the respective randomness threshold value determined for the portions of text, to adapt a text processing system; and
preventing the one or more portions of text whose respective randomness values are determined to satisfy the respective randomness threshold value determined for the portions of text, from being used to adapt the text processing system.

14. The medium of claim 13, wherein the text entry field of the first type is a password entry field and the text entry field of the second type is a document body entry field.

15. The medium of claim 14, wherein the first randomness threshold value is lower than the second randomness threshold value.

16. The medium of claim 13, wherein selecting (i) a first randomness threshold value for portions of text that are input into a text entry field of a first type, and (ii) a second randomness threshold value for portions of text that are input into a text entry field of a second type comprises:
selecting the first and second randomness threshold values for respective particular portions based at least in part on restrictions of numbers of characters permitted in text entry fields in which the respective particular portions are input.

17. The medium of claim 13, wherein selecting the first and second randomness threshold values based at least in part on characteristics of the multiple portions of text comprises:
selecting the first and second randomness threshold values for respective particular portions based at least in part on whether or not user input is masked in text entry fields in which the respective particular portions are input.

* * * * *